Sept. 30, 1969     SHUZO MOROTO ET AL     3,469,443

AUTOMATIC VEHICLE STOP SENSING DEVICE

Filed Nov. 15, 1967     2 Sheets-Sheet 1

Sept. 30, 1969  SHUZO MOROTO ET AL  3,469,443
AUTOMATIC VEHICLE STOP SENSING DEVICE
Filed Nov. 15, 1967  2 Sheets-Sheet 2

United States Patent Office 3,469,443
Patented Sept. 30, 1969

3,469,443
AUTOMATIC VEHICLE STOP SENSING DEVICE
Shuzo Moroto, Tsuneo Kawabe, and Naozi Sakakibara, Asahi-machi, Japan, assignors to Aisin Seiki Company Limited, Aichi-ken, Japan
Filed Nov. 15, 1967, Ser. No. 683,291
Claims priority, application Japan, Nov. 17, 1966, 41/75,692; Nov. 26, 1966, 41/108,408
Int. Cl. G01l 5/28; G01p 3/04, 15/08
U.S. Cl. 73—121
10 Claims

ABSTRACT OF THE DISCLOSURE

Device for the automatic sensing of stoppage of a wheeled vehicle, comprising means operatively connected with a wheel of said vehicle for sensing near-stop condition of said wheel; means operatively connected with said wheel for sensing a predetermined running speed of said wheel, said latter speed being selected to be higher than said near-stop speed; and a comparator arranged for receiving outputs from said both sensing means.

---

This invention relates to improvements in and relating to an automatic vehicle stop sensing device. More specifically, it relates to a device which is so arranged that the running or stopped conditions of a wheeled vehicle is sensed from the wheeling conditions. This kind of device is especially useful as a skid prevention apparatus, or for use with the main head light current supply system or as a brake holder control device.

The driver is frequently confronted with dangerous operating conditions of his car which are called "skid" which means that his car is moving and thus has not yet been brought to a dead stop, but the wheels have been perfectly locked.

Modern automobiles are generally so designed and arranged that when the car is stopped, its main head lights are automatically extinguished when they have been used in their illuminating conditions. On the contrary, the brake holder is kept in its operating condition when and after the car has been stopped. With use of the above kind of automatic stop sensing device, a control signal is delivered therefrom at the stopped conditions of the car and utilized for extinguishing the main head lights, for keeping the brake holder in its continuedly operating condition, and/or further similar purposes.

When the driver brakes his car excessively on a snow-covered and sloping road, for instance, the wheels of the car could be perfectly locked, even though the chassis is still moving. In this case, also, the control signal will be delivered to extinguish the main head lights and to keep the brake holder in its continuedly operating condition, the latter inviting the so-called "skid" conditions of the car which are naturally highly dangerous.

The main object of the present invention is therefore to provide an effective skid-prevention device which is highly valuable for modernized automobile cars capable of running a considerably high speed.

A further object of the present invention is to provide an automatic car stop sensing device, capable of effectively sensing the stopping conditions of the car while positively determining if there be a locked condition in the wheeling.

Still further object is to provide the device of the above kind which is simpler in its design, easier to manufacture and longer in its durable life, in spite of its assurance of the desirous automatic stop-sensing operation from the behavior of the wheeling of the car.

These and further objects, features and advantages of the present invention will become more apparent from the following detailed description of the invention in conjunction with the accompanying drawings illustrative of several preferred embodiments of the invention given only by way of example and thus by no means of limiting sense to the invention.

Figure 1:
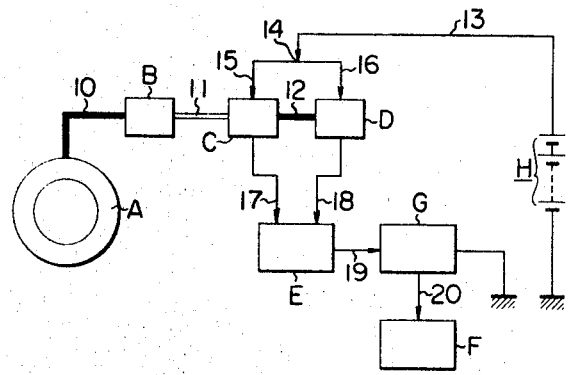
Figure 8:
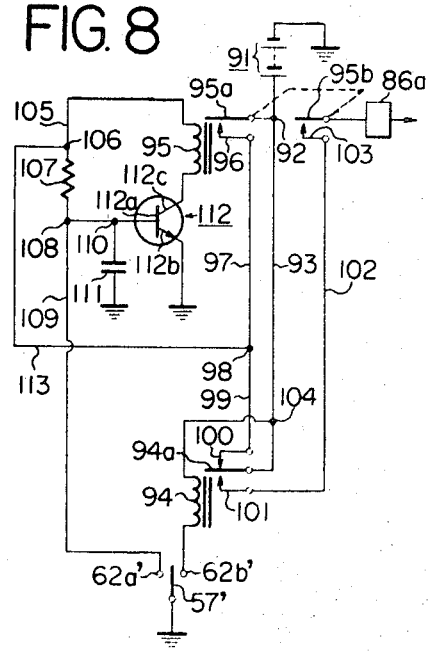
Figure 2:
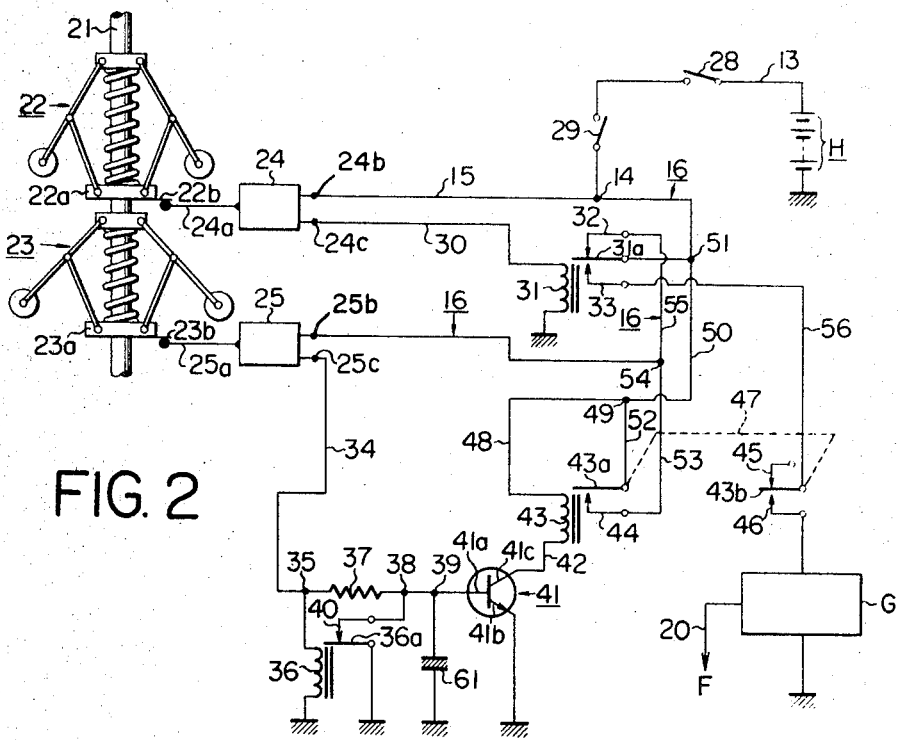
Figure 3:
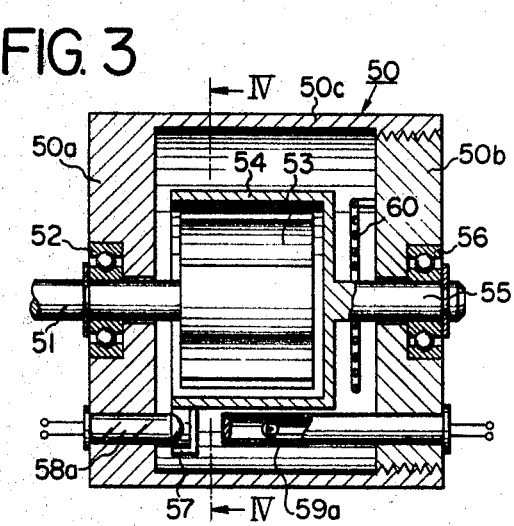
Figure 4:
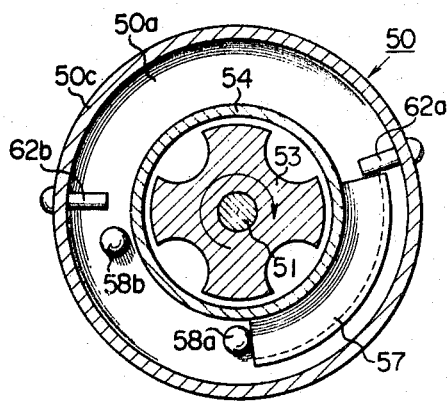
Figure 6:
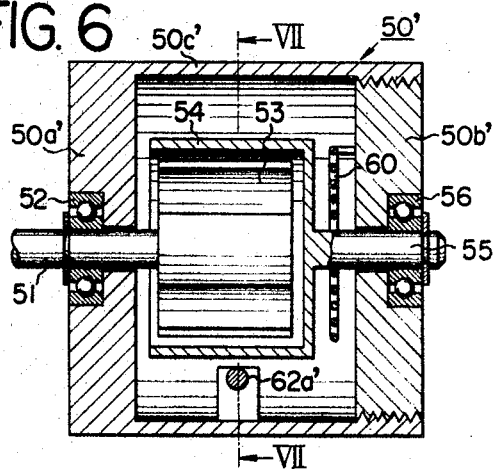
Figure 7:
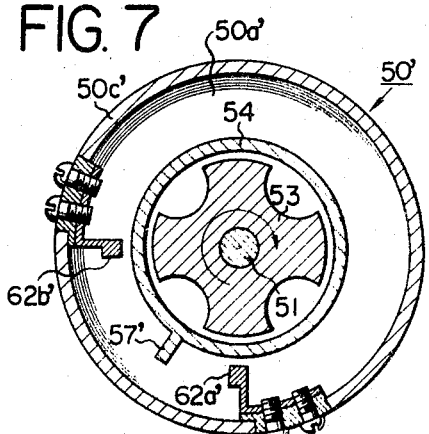
Figure 5:
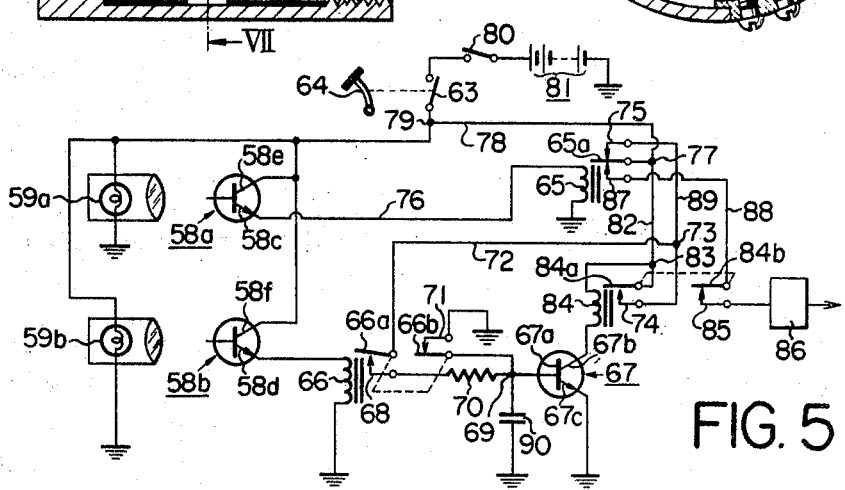

In the drawings:
FIG. 1 is a block diagram of a first embodiment of the invention.
FIG. 2 is a more specific, yet schematic representation of the first embodiment.
FIG. 3 is a longitudinally sectional view of main part of a second embodiment of the invention.
FIG. 4 is a cross-sectional view thereof, taken substantially along the section line IV—IV in FIG. 3.
FIG. 5 is an electric wiring diagram, showing electric and electronic components employed in the second embodiment, as well as the mutual connection thereof.
FIG. 6 is a similar view to FIG. 3, illustrative of a slightly modified form of the second embodiment.
FIG. 7 is a cross-section taken substantially along the section line VII—VII shown in FIG. 6.
FIG. 8 is a similar view to FIG. 5, illustrative several electric and electronic constituents employable in the modified embodiment shown in FIGS. 6 and 7.

Now referring to the drawings, several preferred embodiments of the invention will be described hereinbelow in detail.

In FIG. 1, which illustrates the first embodiment only schematically, A denotes one of the wheels of a car, such as an automobile. The maximum allowable rotational speed of the wheels as at A may be assumed to be 1,200–1,300 r.p.m., as a representative example. B represents only schematically in a block a reduction gearing which is connected at its input side with the axle, not shown, of the wheel A by means of a rigid shaft 10 which is shown in a simplified form by a thick line, the reduction ratio being assumed to be 3:1, as an example. Block C represents schematically a near-stop sensing switch assembly to be described, which is adapted to actuate when the rotational speed of the wheel A is brought to 0—about 2 km., as a representative example. The input side of this switch assembly is mechanically connected with the output side of the reduction gearing B by a flexible shaft, belt drive, chain drive or similar transmission means which is shown in the drawing only schematically by a pair of parallel lines at 11. As will be easily supposed from the foregoing, the assembly C contains a mechanical input part.

Block D represents schematically a delay switch assembly to be described which is adapted to actuate with a certain predetermined time delay, such as 0.3 second as an example, after such a running condition of the car where the running speed of the wheel A will drop to a certain predetermined value such as 10 km./hr. From the above description, it may be well supposed that the delay switch assembly contains a mechanical input part. As shown schematically by a thick line at 12 in FIG. 1, the mechanical input parts of the assemblies C and D are connected rigidly by a rigid shaft with each other, so that certain mechanical input elements of the both assemblies are adapted for unitary rotation with each other.

The positive side of battery H, the negative side of which is permanently connected to earth, is connected through a lead 13 to a junction point 14 which is connected in turn through respective branch leads 15 and 16 to the inputs of said assemblies C and D, respectively, for feeding from battery H currents thereto.

Block E represents schematically a comparator to be described, with its input being connected by leads 17 and 18 with the output of the assemblies C and D, respectively. The output of the comparator E is connected by a lead 19 to an actuator circuit G. The comparator E is designed to be a time differential sensing circuit which is, as will be more fully described hereinafter by reference to FIG. 2, adapted to be either actuating or to non-actuating, according to the time differential, relative to the said predetermined time setting such as 0.3 second as referred to above, between the actuation of said second assembly D and that of said first assembly C. More specifically, when the time differential from the actuation of the second assembly D to that of the first assembly C is shorter than the present time period of 0.3 second, the comparator E is energized to deliver an output signal through the lead 19, while when the said time differential is longer than the present value, the comparator will not be energized. This operating mode is suitable for an anti-skid device, but the on-off relationship may be reversed when the present invention is applied to a brake holder, head light on-off control, or the like. In this case, the brake holder is arranged to release the brake when a skid in sensed. In the similar way, the head light system is maintained automatically "on" when a skid is observed.

In other words, the comparator E does not deliver an output signal, when the wheel A is subjected to a regular braking effort, while it will deliver definitely an output signal current through the lead 19 to the actuator G when the wheel is subjected to a sudden brake and a skid is caused to take place by a locked condition of the wheel.

Block F may be any convenient controlled device fitted on the car, for instance, head light system, brake holder or the like which is preferably to be controlled, depending upon the occasional skid conditions of the wheels as as at A of the car. The input of the controlled device F is connected with the output of the actuator G by a lead 20, for being on-off controlled by the latter in the above sense and as will be more fully described hereinbelow.

Next referring to FIG. 2, there is a common shaft 21 to both a first governor 22 and a second governor 23, series connected mechanically to each other. Although not shown, the common shaft 21 is mechanically connected with the aforementioned flexible shaft 11 in FIG. 1 and therefore may be considered to be same as the shaft 12.

As shown, the governors 22 and 23 are of the conventional centrifugal type and thus a more detailed description thereof may be omitted without sacrificing full understanding of the invention. 24 and 25 denote schematically micro-switches in respective blocks and having therein switch elements, not shown, normally kept in off-condition. These micro-switches are provided with respective switch arms 24a and 25a which are normally kept in resilient contact with actuating projections integral, respectively, with sliders 22a and 23a of the governor 22 and 23. The microswitches 24 and 25 are so designed and arranged that when the actuating projections 22b and 23b exert pressure upon the cooperating switch arms 24a and 25a, the switches 24 and 25 are closed, as will be more fully described hereinafter. These governor-controlled switching operations will take place separately from each other.

It will be clear from the foregoing that the mechanical input part of the first switch assembly C comprises those parts denoted 21, 22 and 22a, and in the similar way the corresponding part of the second switch assembly D comprises those denoted 21, 23 and 23a. The governor switch assembly 22, 24 is so designed and arranged that the wheel A, FIG. 1, is running at a relatively high speed, such as 11–130 km./hr. the contact elements of the first switch 24 are separated from each other, but, when the wheel is suddenly braked, the rotational speed thereof is reduced to 0–2 km./hr., for instance, and that of the governor shaft 21 drops correspondingly, the slider 22a slides along the shaft 21 downwards so as to close the switch 24 so that current from battery H will flow through leads 13 and 15 to the input terminal at 24b, to the first switch 24 when additional switches 28 and 29 inserted in lead 13 have been closed, as will be later described.

Relay coil 31 is connected at its one end through a lead 30 with output terminal 24c of the first switch 24, while the opposite end of the relay coil is earthed.

Relay coil 31 and its contact 31a are so designed and arranged that when the coil is de-energized the contact is kept in contact with upper stationary contact 32, as shown, while, when the coil is energized, the contacting relationship is reversed and the relay contact 31a is brought into contact with the lower stationary contact 33. As shown, contacts 31a and 32 are inserted in the aforementioned lead 16, so far as relay contact 31a is kept in position as shown.

More specifically, the lead 16 extends from terminal 14 through junction 51, contacting contact pair 31a and 32, lead 55 and junction 54 to input terminal to the governor-controlled second switch 25.

Output terminal at 25c of the second governor switch assembly 23, 25 is connected through lead 34 and junction point 35 to one end of a relay coil 36, the opposite end of the latter being connected to earth. Junction 35 is connected through resistor 37 and junctions 38 and 39 to the base electrode 41a of a transistor 41. Relay coil 36 has a movable contact 36a to be controlled thereby, which is arranged to cooperate with stationary contact 40 and normally kept in contact therewith, said former contact 36a being connected permanently to earth and said later contact 40 being connected permanently with said junction 38. Condenser 61 is connected with its one electrode with said junction 39 and with its another electrode with earth, as shown. Resistor 37 and condenser 61 constitute in combination a delay circuit for retarding the operation of said transistor 41.

Emitter electrode 41b of transistor 41 is connected to earth, while collector electrode 41c thereof is connected through a lead 42 to relay coil 43 which has a relay contact 43a to be controlled thereby, said relay contact being arranged to cooperate with stationary contact 44 and normally kept separated therefrom. Another relay contact 43b of the relay coil 43 is kept normally in contact with upper stationary contact 45, and kept in separation from lower stationary contact 46. Broken line 47 represents that the both relay contacts 43a and 43b are to be operated in unison with each other.

Another end of relay coil 43 is connected through lead 48, junction 49 and lead 50 to junction 51 included in said lead 16, as already referred to, and relay contact 43a is connected through lead 52 to said junction 49. Stationary contact 44 is connected through lead 53, junction 54 and further lead 55 to stationary contact 32. Contact 33 is connected through lead 56 to relay contact 43b.

Switch 28 inserted in the lead 13 is the starting switch which is closed when and after the operator starts the car, thereby keeping the arrangement so far described, in its ready-operative condition.

Switch 29 inserted again in the lead is a de-accelerator switch which is mechanically connected with the regular accelerator pedal, not shown, on the car and arranged so that it is closed when occasional foot pressure exerted by the car driver has been released therefrom.

The second governor switch assembly 23, 25 is so designed and arranged that when the rotational speed of the wheel A drops to a value less than a predetermined value such as 10 km./second as was already hinted, the slide 23a lowers in its position along the shaft 21 and the second switch 25 is thereby closed, and therefore the present conductive contact of the switch will take place in advance of the similar closure of the first switch 24.

The operation of the device so far described is as follows:

It is now assumed that the driver has actuated a sudden brake upon the wheel A which is assumed to be running downwardly on a sloped and snow-covered road and a skid condition of the wheel A has taken place. It will be clear that in this case, the switches 28 and 29 inserted in the lead 13 have been closed.

When the running speed of the wheel A drops beyond a predetermined value such as 10 km./hr. as was referred to hereinbefore, the second switch 25 is closed as set forth above.

Current will now be conveyed from battery H through the circuit comprising: 13–28–29–14–16–51–31a–32–55–54–16–25b–25–25c–34–35 to the relay coil 36, when following the illustrated numerals in FIG. 2, thereby relay contact 36a being actuated and brought into separation from its mating contact 40. In this way, the delay circuit comprising resistor 37 and condenser 61 begin to conduct, and the base potential at 41a of the transistor 41 will begin to elevate gradually. Therefore, an actuation of the delaying side relay coil 43 by conduction of the transistor 41 will occur after a certain time lag, for instance, 0.3 second, as an example. This time lag may be made adjustable by making one of the time constant elements 37 and 61 to be adjustable.

On the other hand, the first governor switch assembly 22, 24 will act almost instantly on account of the skid condition of wheel A, thereby bringing the related switch 24 into conductive operation, indeed, in advance of that of the transistor 41 referred to above.

Current will flow from battery H through the now established circuit containing several parts: 13–28–29–14–15–24b–24–24c–30 to relay coil 31, thereby the normally closed contact pair 32–31a being opened. Thus, the abovementioned conducting relation between battery H and the second governor switch 25 is interrupted at this point. Therefore, the delayed side relay coil 43 can not be energized, and its second contact 43b is kept separated from stationary contact 46 as shown. No current will therefore flow to the actuator G and thus, for instance, the head lights, not shown, fitted on the car and arranged to be controlled by the actuator can not be interrupted.

The head lights will be thus maintained to illuminate, in spite of the locked condition of the wheels such as that denoted A.

In the case of a brake holder, not shown, arranged to be controlled by the above arrangement, the stationary contact 45 is connected to a control valve which is adapted to control the flow of pressure oil from the master cylinder to the wheel cylinder. In this case, contact 45 is connected permanently to said control valve which is so designed and arranged that when it receives a control current from the present device, the valve reduces the applied hydraulic brake pressure.

When the brake is applied to the wheel in the regular way so that there is no skid condition, it will be clear from the foregoing that both contacts 45 and 43b are separated from each other, and no control current will be delivered from the output contact 45. Therefore, in this case, said control valve will act in the normal way.

On the contrary, when there is a skid condition, contacts 43b and 45 are kept in contact with each other as shown, and thus, said control valve will be actuated to reduce the brake pressure.

In the case of the skid-prevention device, the arrangement may be such that said contact 45 is connected to a hydraulic pressure control means which may be so designed that when it receives a control current from the contact 45, it will act to increase the otherwise constant volume of the hydraulic liquid available for maintaining the braked condition. By this volumetric increase of the contained pressure liquid, the hydraulic braking effort can be reduced to a certain value which is slightly below the level at which a skid may take place. Therefore, in this case, the skid can be obviated in the similar way.

Next referring to the drawings, especially FIGS. 3–8 thereof, the numerals 50 generally denotes a hollow casing, comprising end walls 50a and 50b and a cylindrical wall 50c. In the embodiment shown, the end wall 50a is made integral with the cylindrical wall 50c to which another end wall 50b is threaded.

An input shaft 51 is rotatably mounted in anti-friction bearing 52 and extends into the interior of said casing 50, said bearing being mounted in the end wall 50a. Although not shown, the projecting end of the input shaft 51 from the housing 50 is directly coupled with an axle of a wheeled vehicle, or operatively connected therewith through a gearing, a clutch, a chain transmission or the like. At the inside end of the input shaft 51, there is provided a magnetic drive wheel 53, preferably made from a ferro-magnetic material and formed into a cross or a star in its cross-section and keyed to the shaft for unitary rotation therewith, as most clearly seen from FIG. 4.

54 denotes a driven rotor which is made preferably of a magnetism-inducing material such as iron or steel and shaped into a cup wheel, as shown, which is kept at a slight concentric distance from the outermost periphery of the drive wheel 53. Thus, the drive wheel 53 and the driven rotor 54 constitute in combination a kind of magnetic coupling. A rotor shaft 55 is made rigid and concentric with the rotor 54 and rotatably mounted in anti-friction bearing 56 which is in turn mounted in the end wall 50b.

A shield member 57 has an arc strip configuration when seen in its end view shown in FIG. 4 and an angular cross-section as shown in FIG. 3, and is fixedly mounted on the periphery of the rotor 54.

Photo-transistors 58a and 58b are mounted in the end wall 50a and become conductive when they receive light beams emanating respectively from lamps 59a and 59b which are arranged in opposition to the respective photo-transistors 58a and 58b mounted in the opposite casing wall 50b, as easily seen from FIGS. 3 and 4, although in FIG. 3 the opposite arrangement of another pair of photo-transistor 58b and lamp 59b is not shown.

A spiral spring 60 is fixed at its one end with the rotor shaft 55 and at its another end with the casing wall 50b. Stops 62a and 62b are mounted on the cylindrical casing wall 50c and so arranged that when the drive wheel 53 is kept stationary, the shield member 57 is kept in pressure contact with one of the stops as at 62a under the influence of the urging torque exerted by the spiral spring 60 acting on the rotor shaft 55 and the photo-transistors 58a and 58b are kept conductive by receiving light beams from the respective lamps 59a and 59b. Another stop serves for limiting the shiftable range of the rotor 54 from its stationary position shown in FIG. 4 in the peripheral direction of the casing cylinder part 50c.

As shown in FIGURE 5, lamps 59a and 59b are earthed at their respective one ends and electrically connected with collector electrodes 58e and 58f of photo-transistors 58a and 58b, and at the same time with a switch 63 which is cooperatively connected with a conventional accelerating pedal 64 of the vehicle. The emitter electrodes at 58c and 58d of the photo-transistors are earthed through relay coils 65 and 66, respectively. Relay contact 65a is controlled by the relay coil 65. In the similar way, contact 66a is controlled by the relay coil 66.

The base electrode at 67a of a transistor 67 is electrically connected with a stationary-contact 68 through junction 69 and resistor 70, said contact 68 being arranged to cooperate with the relay contact 66a. Junction 69 is earthed through the intermediary of condenser 90. Relay contact 66b connected with said junction 69 is arranged to cooperate with stationary contact 71, said relay contact 66b being again on-off controlled by said relay 66 in unison with said contact 66a. Stationary contact 71 is connected permanently to earth, while relay contact 66a is connected through a lead 72 to a junction 73 which is connected with stationary contact 74, on the one hand, and with stationary contact 75, on the other.

Emitter electrode 58c of photo-transistor 58a is connected through a lead 76 to relay coil 65 which is earthed and has relay contact 65a to be controlled thereby. This relay contact 65a is connected through junction 77 and lead 78 to a further junction 79 which is connected in turn through switch 63 and main switch 80 to the positive side of battery 81, while the negative side thereof is earthed permanently.

Junction 77 is connected through lead 82 and junction 83 to relay contact 84a which is on-off controlled by relay coil 84, the latter being connected with said junction 83, on the one hand, and with the collector electrode at 67b of said transistor 67, on the other. The emitter electrode at 67c of the transistor 67 is earthed. Relay coil 84 has another relay contact 84b which is arranged to cooperate with a stationary contact 85 which is connected electrically to a control device 86 shown only schematically by a block and being preferably a relay switch or the like which is designed and arranged to control, preferably in the on-off control manner, a controlled device, such as main head light lighting system or brake holder, anti-skid device or the like.

Stationary contact 87 which is normally kept in contact with relay contact 65a is connected through a lead 88 to relay contact 84b. Stationary contact 75 which is normally kept in separation from relay contact 65a is connected through a lead 89 to said junction 73.

The operation of the second embodiment shown in FIGS. 3–5 is as follows:

Now it is assumed that the wheel of the car fitted with the present device, the input shaft 51 and the drive wheel 53 are rotating in unison with each other in the clockwise direction in FIG. 4, and that under these conditions the driver brakes the car wheel.

As well known, it is a driver's practice that during such braking operation the conventional accelerating pedal at 64, see FIG. 5, is completely released of any driver's foot pressure and thus the switch 63 is kept in closed condition as shown.

With progress of the braking manipulation, the rotational speed of the drive wheel 53 will naturally be reduced in its value and thus the mutual magnetic attracting force acting between the drive wheel and the driven rotor 54 will be correspondingly reduced, thereby the latter being caused to rotate in the counter direction in FIG. 4 under the action of the spiral spring 60. The shield member 57 will naturally follow the movement of the rotor 54, until it will have been brought into engagement with stationary stop 62a, as shown.

In the course of this relative reversing motion of the rotor and the shield member, lamp 59b is brought into illuminating communication with its mating photo-transistor 58b which turns thus conductive and the related relay 66 will receive current from battery 81 through the path: 80–63–79–58f and 58d and be thereby energized. By this energization, the normally opened relay contact 66a is brought into contact with stationary contact 68, while the normally closed relay contact 66b is caused to open from contact with stationary contact 71. Current will therefore be conveyed from battery 81 through: 80–63–79–78–77–65a–75–73–72–66a–68–70 (resistor)–69–90 (condenser) to the earth, then returning again to said batteries. The resistor and condenser act in combination as time constant elements as in the case of the first embodiment having similar elements 37 and 61. The condenser 90 is therefore gradually charged up, and the base electrode potential 67a of transistor 67 will be gradually elevated. When this base potential has become a certain predetermined value, the transistor will become conductive, so as to energize relay coil 84, thus relay contact 84a is closed with stationary contact 74. In the similar way, another relay contact 84b will be closed with stationary contact 85.

When the wheel is brought into its dead stop condition, lamp 59a projects light beams upon photo-transistor 58a which becomes thus conductive, thereby relay coil 65 is energized and relay contact 65a is separated from upper contact 75 and closed with lower contact 87.

It is assumed that a controlled device capable of extinguishing the head light system, a brake holder or anti-skid device which must be actuated at the time of stoppage of the car, as in the case of the foregoing embodiment is connected to said control device 86. When the wheel is stopped, current will flow from battery 81 through: 80–63–79–78–77–65a–87–88–84b–85 to said control device 86. Therefore, the controlled device is controlled, for instance, to extinguish the head light system, as similarly in the foregoing embodiment.

When the wheel is subjected to a sudden brake under high speed running, or while running on a snow-covered downway, the wheel may be locked.

In this case, also, the transistor 58b will first become conductive and relay 66 will be energized, thereby relay contact 66a being closed and that denoted 66b being opened in the foregoingly described manner. Current will therefore flow through resistor 70 and condenser 90. Before the base potential at 67a has elevated to enough value to bring the transistor 67 into conduction, photo-transistor 58a may receive light beams from its cooperating lamp 59a and will thus become conductive.

Then, relay coil 65 becomes energized, relay contact 75 is opened while another relay contact 65a will be brought into contact with stationary contact 87. Thus, the transistor 67 will become non-conductive and thus relay coil 84 will become de-energized. Therefore, relay contacts 84a and 84b are kept in separation from mating stationary contacts 74 and 85, respectively. Thus the current path between battery 81 and control device 86 is interrupted at these points. Therefore, no output control signal current will flow from the device 86 to the controlled device.

In a modified arrangement shown in FIGS. 6–8, numerals 51, 52, 53, 54, 55, 56 and 60 denote respectively similar constituents as before. In the present modification, however, the casing 50' consists of end wall 50a' and cylindrical wall 50c' which are made from a conducting material such as copper, for utilizing these parts of the casing as current path, while the remaining end wall 50b' is made from an insulating material such as synthetic resin. In place of the shield member 57 in the foregoing embodiment is a single radially and outwardly extending projection 57' which is adapted to act as a movable contact arranged so as to cooperate either of two stationary contacts 62a' and 62b', as most clearly seen in FIG. 8. As seen from FIGS. 6–7, these stationary contacts have been formed as conductive stops fixed on the inside conductive wall surface of the cylindrical wall part 50c'.

Battery 91, having its negative side earthed as before is connected at its positive side through junction 92 and lead 93 to a relay contact 94a which is to be controlled by relay coil 94.

Relay coil 95 has a relay contact at 95a which is connected with said junction and normally kept in separation from a stationary contact 96 which is connected through lead 97, junction 98 and lead 99 a stationary contact 100 which is normally kept in contact with said relay contact 94a which is however normally in contact with another stationary contact 101. This contact 101 is connected through a lead at 102 to a stationary contact 103 which is arranged to cooperate with relay contact 95b to be controlled by said relay coil 95, yet normally being kept from the relay contact. A junction 104 is inserted in the lead 93 and is connected to one end of said relay coil 94, while the opposite end of the latter is connected with stationary contact 62b'.

One end of relay coil 95 is connected through lead 105, junction 106, resistor 107, junction 108 and lead 109 to stationary contact 62a'.

Junction 108 is connected through junction 110 to the base electrode 112a of transistor 112 and the junction 110 is connected through condenser 111 to earth. Emitter electrode 112b is earthed, while collector electrode 112c is connected to relay coil 95. Junction 98 is connected through lead 113 to junction 106.

86a denotes a control device which can function as that shown at 86 in the foregoing embodiment, and is connected with relay contact 95b.

The operation of the present modification is as follows:

When the braking effort is applied to the wheel, such as that described in the foregoing embodiments, the rotor 54 will be rotated in the counterclockwise direction in FIG. 7 under the influence of return spiral spring 60 as in the same way set forth hereinbefore. At first, the projection or movable contact 57′ will be separated from contact with stationary contact 62b′.

Current will now flow from battery 91 through: 92–93–104–94a–100–99–98–113–106–107 (resistor)–108–110–111 (condenser) to earth. The resistor and condenser act as time constant elements as before. Thus, the condenser 111 is charged up gradually, and the base potential at 112a of the transistor 112 will gradually be elevated. When this base potential has become a certain predtermined value, the transistor will turn to conductive, so as to actuate relay coil 95, for closing the contacts 96 and 103.

When the wheel revolution has been brought into dead stop, movable contact 57′ will be brought into contact with stationary contact 62b′, thereby the relay coil 94 being energized.

Thus, contact 100 is closed, while contact 101 is opened.

When a suitable control device 86a, which can be deemed as the same as before which has been described with reference to 86 in the foregoing embodiment, is connected to relay contact 95b, this device will act in the similar way as before, when the car has been stopped perfectly.

Now considering the locked condition of the wheel during stopping operation of the car, the movable contact 57′ is separated as before from stationary contact 62a′. Therefore, the base potential at 112a will become gradually elevated. But, in this case, in advance of the transistor becoming conductive, a new contacting relation between contacts 57′ and 62a′ will be established, thus relay coil 94 becoming de-energized with its contact 100 being opened and its other contact 101 being closed. The circuit including the transistor 112 is interrupted, thereby relay coil 95 being not energized. Therefore, contacts 96 and 103 are kept in open condition and therefore no current will flow from battery 91 to the control device 86a. This result can be utilized for the desired control purpose.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim is:

1. A device for the automatic sensing of stoppage of a wheeled vehicle, comprising means operatively connected with a wheel of said vehicle for sensing near-stop condition of said wheel; means operatively connected with said wheel for sensing a pre-determined running speed of said wheel, said latter speed being selected to be higher than said near-stop speed; and a time differential sensing means arranged to receive the outputs from said both sensing means for providing an indication when the time differential between the sensed near-stop condition and the sensed pre-determined running speed condition is less than a pre-determined value, said indication denoting a skid condition of said wheeled vehicle.

2. The device according to claim 1 wherein said near-stop sensing means includes a speed responsive device driven by said wheel and a first switch assembly actuated by said first speed reponsive device, said pre-determined speed responsive means includes a second switch assembly actuated by said speed responsive device, and said time differential sensing means includes a resistor and a condenser forming a timing circuit, a third switch assembly actuated after a pre-determined time lag determined by said timing circuit, and a discriminating circuit for detecting the sequence of operation of said first and third switch assemblies, said discriminating circuit being operative to prevent the actuation of said third switch assembly when said first switch assembly is actuated within said predetermined time lag.

3. The device according to claim 2 further comprising means responsive to said discriminating circuit for shorting said condenser when said first switch assembly is actuated within said pre-determined time lag.

4. The device according to claim 3 further comprising means for resetting said timing circuit by shorting said condenser prior to the actuation of said second switch assembly.

5. The device according to claim 4 wherein said third switch assembly comprises a transistor and a relay, said transistor being connected to said relay to control the current through the armature thereof, and said timing circuit being connected to the base of said transistor to cause said transistor to conduct after said condenser has charged to a pre-determined level.

6. The device according to claim 1 wherein said near-stop sensing means includes a first governor and a first switch actuable by said first governor at the near-stop condition of said vehicle, and wherein said pre-determined running speed sensing means includes a second governor and a second switch actuable by said second governor of the said pre-determined running speed of said vehicle, said device further comprising means for mechanically connecting said first and second governors to a wheel of said vehicle to be driven thereby.

7. The device according to claim 1 wherein said near-stop and pre-determined running speed sensing means comprise a magnetic dirve wheel coupled to and driven by a wheel of said vehicle, a cup-shaped rotor of magnetism-inducing material positioned concentrically of and at a slight distance from the outer periphery of said drive wheel and biased in the direction opposite the normal direction of rotation of said drive wheel and switch means operable by said rotor.

8. The device according to claim 7 wherein said switch means includes a first photo-electric switch operable at said pre-determined running speed condition, and a second photo-electric switch operable at said near-stop condition.

9. The device according to claim 7 wherein said switch means includes a projection on said rotor and two stationary contacts positioned to be alternately engaged by said projection due to the rotation of said rotor.

10. The device according to claim 1 further comprising a controlled device connected to said time differential sensing means to be actuated thereby.

References Cited

UNITED STATES PATENTS

| 2,747,699 | 5/1956 | Lucien | 73—517 X |
| 2,972,107 | 2/1961 | Criswell | 58—145 X |
| 3,131,976 | 5/1964 | Miller | 73—514 X |
| 3,260,555 | 7/1966 | Packer | 324—69 X |
| 3,331,200 | 7/1967 | Byron et al. | |

RICHARD C. QUEISSER, Primary Examiner

J. W. MYRACLE, Assistant Examiner

U.S. Cl. X.R.

73—510, 517